United States Patent [19]

Zinck

[11] Patent Number: 4,660,480
[45] Date of Patent: Apr. 28, 1987

[54] PROCESS AND DEVICE FOR LOOSENING AGRICULTURALLY USED SOIL

[76] Inventor: Eugen Zinck, Hueffelsheimer Str. 2, 6550 Bad Kreuznach, Fed. Rep. of Germany

[21] Appl. No.: 782,195

[22] Filed: Sep. 30, 1985

Related U.S. Application Data

[63] Continuation of Ser. No. 541,642, Oct. 13, 1983, abandoned.

[30] Foreign Application Priority Data

Oct. 13, 1982 [DE] Fed. Rep. of Germany ....... 3238003

[51] Int. Cl.$^4$ ............................................. A01B 37/00
[52] U.S. Cl. ....................................................... 111/7
[58] Field of Search .......................... 111/6, 7, 7.1–7.4, 111/1; 37/141 R, 98, 193, DIG. 18, 78, 201, 80 R, 195; 172/699, 40, 755; 239/538; 299/13, 14, 36

[56] References Cited

U.S. PATENT DOCUMENTS

| 261,558 | 7/1882 | Lambert ................................. 111/7 |
| 414,346 | 11/1889 | Wainwright ........................ 239/538 |
| 1,739,765 | 12/1929 | McEwen . | |
| 3,461,577 | 8/1969 | Clark et al. ........................ 299/13 X |
| 3,546,886 | 12/1970 | Jones et al. ....................... 111/7 X |
| 3,619,917 | 11/1971 | Fischer ............................. 299/13 X |
| 3,713,496 | 1/1973 | Codlin ................................. 172/699 |
| 3,834,330 | 9/1974 | Wallace ................................. 111/7 |
| 3,887,237 | 6/1975 | Bailey et al. ...................... 37/193 X |
| 3,908,567 | 9/1975 | Brannan ................................. 111/7 |
| 4,233,915 | 11/1980 | Kordon . | |

FOREIGN PATENT DOCUMENTS

| 615811 | 7/1935 | Fed. Rep. of Germany . |
| 1214463 | 4/1966 | Fed. Rep. of Germany . |
| 2742606 | 3/1979 | Fed. Rep. of Germany . |
| 1463474 | 11/1966 | France . |
| 92485 | 10/1959 | Netherlands ............................. 111/6 |
| 1219860 | 1/1971 | United Kingdom ..................... 111/7 |
| 686655 | 10/1979 | U.S.S.R. ................................. 111/6 |
| 753380 | 8/1980 | U.S.S.R. ................................. 111/6 |

Primary Examiner—James R. Feyrer
Assistant Examiner—Danton DeMille
Attorney, Agent, or Firm—Schwartz, Jeffery, Schwaab, Mack, Blumenthal & Evans

[57] ABSTRACT

Disclosed is a process employed for loosening agriculturally used soil, particularly for the in-depth loosening of compacted soil by injecting air into the soil. To do so, a probe is pulled through the soil continuously in direction substantially parallel to its surface. While the probe is being conveyed through the soil by way of a tractor, for example, compressed air is abruptly released at intervals in eruptive bursts so that soil loosening is achieved in a continuous operational flow.

16 Claims, 1 Drawing Figure

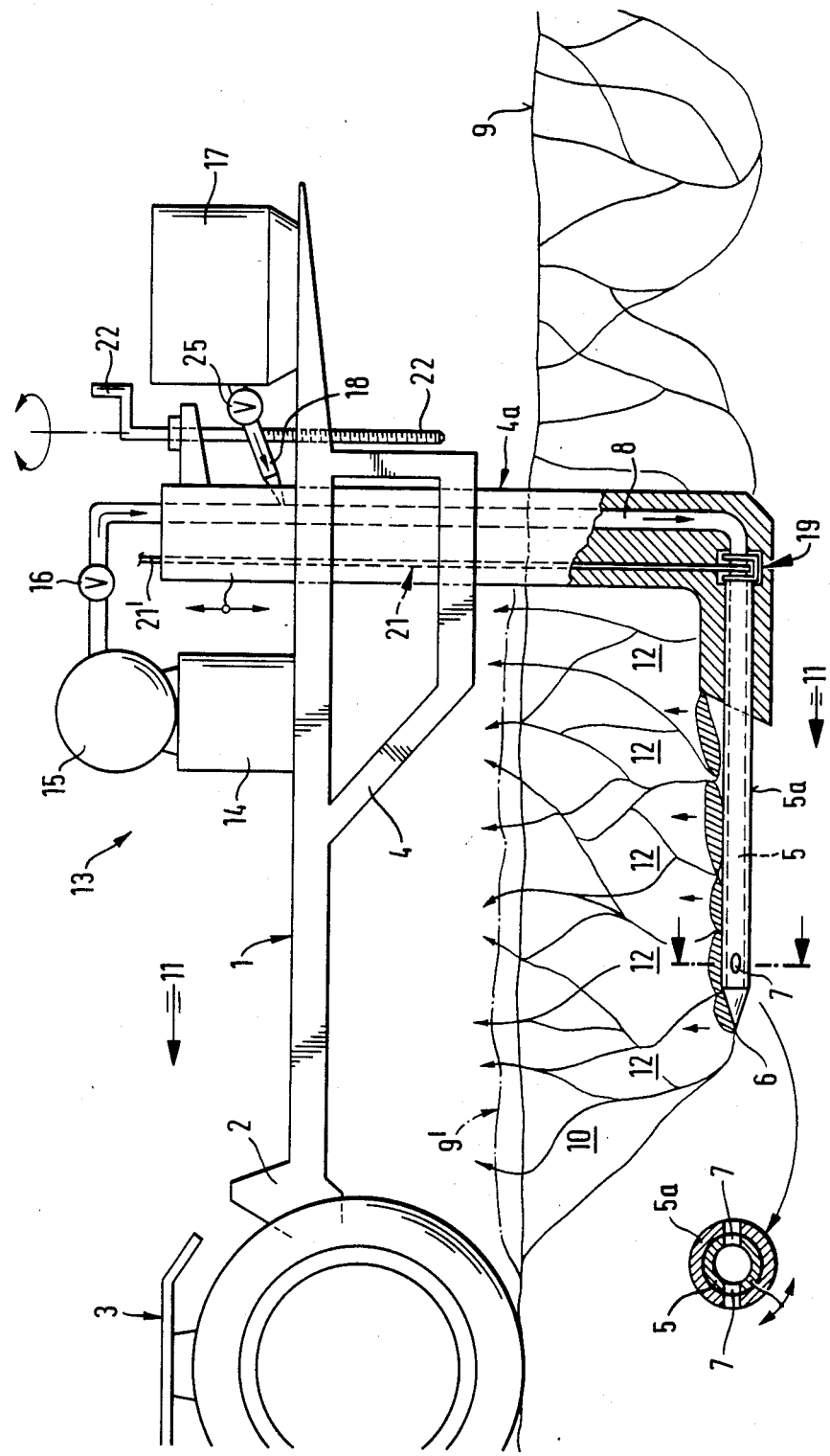

PROCESS AND DEVICE FOR LOOSENING AGRICULTURALLY USED SOIL

This application is a continuation of application Ser. No. 541,642, filed Oct. 13, 1983, now abandoned.

The invention relates to a process employed to loosen agriculturally used soil in accordance with the features set forth in the generic part of claim 1, and to a device for putting said process into practice.

BACKGROUND OF THE INVENTION

In one process proven to be useful a probe is inserted from above into the soil in a substantially vertical direction and pushed down to the depth required. Thereupon, the soil is abruptly loosened by means of compressed air. Next, the probe is pulled up and reinserted into the soil at a suitable distance. The process of vertically inserting the probe into the soil, pulling it up and reinserting it is repeated until the entire surface, or the soil area to be so treated, has been loosened. Particularly if the area to be treated is extensive, continuous insertion and pulling up of the probe may slow down the flow of operations (cf. German patent No. 27 42 606).

SUMMARY OF THE INVENTION

The problem to be solved by the invention is to provide an improved process for loosening agriculturally used soil with bursts of compressed air in a manner designed to achieve a more uniform flow of operations and enhanced performance while doing away with repeated probe insertions.

In the process according to the invention, soil is loosened in a continuous operation by intermittent injection of compressed air into the soil. Sudden blasts of compressed air released at intervals will cause eruptively loosened areas to form within which the soil structure is advantageously loosened without being damaged in any way whatsoever. The soil is torn apart and made permeable along existing lines of breakage formed by organic matter, and advantageously enriched in oxygen by the air injected.

During the continuously-repeated periodic eruptive blasts, the probe, preferentially a tube measuring approx. 80 cm in length, is moved on continuously in a direction substantially horizontal or else parallel to the surface of the soil. This provides the advantage of causing consecutive eruptions strung out behind each other within the soil, while simultaneously permitting a uniform spread of loosened soil to be obtained in the course of a single, continuous flow of operations.

It may be appropriate to provide the tubular probe with a point oriented in the direction of travel and designed to surmount the resistance of the soil in a manner avoiding any deflection of the soil in the movement of the probed to the surface of the soil. So as to permit discontinuous ejection of compressed air, it may be advantageous to provide the tubular probe with at least one air outlet at either side and substantially near a first end of the probe in the direction of travel. On a cross-sectional view, such air outlets would thus be preferentially located in the three o'clock position on the right side and in the nine o'clock position on the left side. Thus, the compressed air will be injected more or less horizontally into the soil, causing eruptively loosened areas, the diameter of which will increase as they come nearer to the surface of the soil. It is also possible to arrange the air outlets of the tubular probe so as to direct the bursts of compressed air not horizontally towards the two sides but obliquely downwards, or upwards at a slight angle, the latter method reducing the eruptive effect caused within the soil.

With a view towards loosening the soil more efficiently, it may be suitable to space several probes along a supporting rack, preferentially at a distance of 50 cm of each other. Their attachment may be designed so as to make the distance between probes adjustable in a manner to permit spacing at more or less than 50 cm.

In a preferred embodiment, the supporting rack carrying the probes may be arranged behind a tractor pulling the probes forwards through the soil being eruptively loosened. The probes are supported substantially near a second end, opposite the first end, and away from the direction of travel. The supporting rack for carrying the probes may be designed to be height-adjustable, for instance by means of a tractor-mounted hydraulic unit, permitting probe depth to be chosen and reset as required from above-ground. Height adjustment is particularly advantageous when the probes are run into the soil at the commencement of soil loosening. In order to introduce the probes, it will be useful to arrange the supporting rack in a position having any probe to be introduced point downwards and forwards in the direction of travel. While the probe is lowered, the tractor may advance slowly, causing the probe to be pushed deeper and deeper into the soil. In order to facilitate this process of introduction, blasts of compressed air may from the start be injected abruptly into the soil, thus loosening the soil, reducing friction and facilitating introduction into the soil. The probe or supporting frame can be lowered until the probe reaches its working position roughly parallel to the surface of any soil to be treated.

The compressed air may be generated by a compressor to be arranged on the tractor or on the supporting rack, as desired. In order to obtain reserves to compensate for varying air requirements, it is preferable to introduce the compressed air so generated into a compressed air vessel ensuring that compressed air reserves are invariably sufficient. The probe will be supplied with compressed air from such compressed air vessel, any feed line leading to the probe being made of rigid pipe or some similar material within the soil and slightly above it, in order to guarantee that it will stand up to any forces arising in this area. It is advantageous to control the air blasts to be dispensed through the probe by a valve between the vessel and the probe. Said valve is preferably of a rapid-action type so as to obtain precisely spaced blasts of compressed air at the very short intervals necessary to accomplish the objects of the invention.

Moreover, it may be advantageous to provide another reservoir, mounted on the tractor or on the supporting rack, for holding fertilizer, or a filler material such as polystyrene beads so as to prop apart any eruptively loosened areas. Filler or fertilizer materials may be fed into the probe by way of rigid piping and introduced periodically into the hollow spaces within the loosened soil. Injection of filler or fertilizer materials is preferentially to be performed immediately after the various blasts of compressed air, thus causing the filler and fertilizer materials to be spread widely within the hollow spaces then being created. The intervals between individual injections of filler or fertilizer materials are designed to be practically identical to the intervals between eruptive blasts.

In the process according to the invention, the probe is introduced into the soil so as to be within a range laying between 20 cm and 100 cm beneath the surface of the soil. It will normally be advantageous to choose a working range some 50 cm to 80 cm beneath the surface. However, it will be possible to push the probe even deeper into the soil in order to obtain optimum eruptive efficiency even with special types of soil.

Eruptive blasts may be timed so as to make the eruptively loosened areas generated by the advancing probe contiguous with each other. It may be useful to shorten the interval between individual eruptive blasts slightly so as to have the eruptively loosened areas generated by the advancing probe overlap. This will, in any event, guarantee a continuously loosened strip of soil.

In connection with, or in dependence upon, further processing or operating parameters, it may be possible to vary or control the frequency of eruptive blasts in a manner suitable to use automatic control features as varied, and as extensively, as possible.

For instance, the frequency of eruptive blasts may be adapted to the pressure of the compressed air released. In this context, it may be advantageous to increase the frequency of eruptive blasts whenever the pressure is decreasing. Moreover, it will be possible to control the frequency of eruptive blasts as a function of probe depth within the soil by reducing, for instance, the frequency for a deeper probe position whenever the size of eruptively loosened areas increases. The more rapid the probe is pulled through the soil, the higher the frequency of eruptive blasts will have to be. In addition to that, it will be possible to combine the controlling factors mentioned above so that there will be manifold possibilities of optimum process control depending upon the requirements to be met.

BRIEF DESCRIPTION OF THE DRAWINGS

In the drawing, the single FIGURE is a cross-sectional representation of the soil-loosening device according to the present invention depicting one probe in its operative position being at the surface of the soil.

The device shown by way of embodiment on the drawing comprises a supporting rack of the plough-beam type attached to a coupling (2) of a tractor's (3) hydraulic unit by means of which the height of the device can be adjusted. By means of a holding device (4) featuring, for instance, a fastening and adjusting pocket, a vertical shaft is provided, the height of which can be modified relative to the supporting rack (1) on which it is provided by means of an adjusting spindle (22). Within shaft (4a) there is line (8) used to feed in compressed air and filler material such as polystyrene beads etc., or to feed in the air/filler mixture to be ejected immediately, preferably within a fraction of a second, upon the initiation of the corresponding blast of compressed air. Moreover, the shaft comprises an adjusting rod (21') or some similar component of a rotating devie (21) to rotate tubular probe (5) around its longitudinal axis. Tubular probe (5) features a point (6) and, immediately next to it, outlet openings (7) arranged diametrically opposed on the sides of the tube. According to the invention, there is a solid pipe (8), providing compressed air to probe (5), within shaft (4) for protecting the line. According to the invention, probe (5) is surrounded coaxially by an outer tube (5a) and supported within it so as to permit it to be rotated periodically within outer tube (5a) by means of a rotating device (21) which is synchronized with any suddenly released air blast or with the mixture of air and filler material so that its outlet openings (7) will be unprotected only briefly while the compressed air and/or filler material is being released into the soil. Outer tube (5a) comprises openings which can be superimposed upon the outlet openings (7) of the tubular probe. In an embodiment of the device according to the invention, the openings (7) of probe (5) may remain closed while the probe is advancing so that neither the openings nor the probe itself will be clogged by intruding soil particles.

According to the invention, the bottom area of the rotating device (21) is connected to an actuating linkage or to any similar component located within shaft (4a).

As already mentioned, the depth of the tubular probe beneath the surface can be set to any value between, for instance, 45 cm and 100 cm by means of the adjusting spindle (22) shown diagrammatically. Depending upon the power provided by the tractor, one or several units may be attached to the tractor side by side.

As can be seen from the drawing, probe (5) may be arranged at a depth of 60 cm beneath the surface (9) of the soil. In this position, probe (5) will be in a position substantially parallel to the surface (9) of the soil. Its point (6) is oriented along the direction tractor (3) will travel, which means in the operating direction according to the arrow (11).

Point (6) of probe (5) will make it easier to surmount soil resistance while the probe is advancing. Shaft (4a) may be designed in a similar shape for reducing soil resistance, such as a knife-like shape.

Bringing probe (5) and its outer tube (5a) down to the operating depth required is performed by breaking up the soil by brief blasts of compressed air suddenly ejected into the soil while the probe is being pivoted in so that the tubular probe can be inserted without encountering any substantial resistance into the soil so loosened, and without there being any hazard of damaging the probe. For the purpose of pivoting the device into the soil according to the invention, it is conceivable to provide an additional rotary hoe or some similar implement to make a slot in the soil through which the probe can be introduced, or removed subsequent to operations. The probe can be pivoted out easily if the tractor is standing and after another such a slot has been made by such hoe.

Shaft (4a), being downstream from the probe point while advancing through the soil (10), will inevitably be pulled through the loosened area so that the soil resistance to be surmounted by it will be relatively low. While probe (5) is advancing, its entire surface will be tightly packed in earth within the soil (10) so that eruptive bursts can, according to the invention, loosen the soil suddenly and in a highly efficient way.

The embodiment represented diagrammatically shows a pressure generation unit (13) arranged on the supporting rack; it might likewise be attached to tractor (3). Pressure generation unit (13) comprises a compressor (14) for compressing the air taken in and delivering it to compressed air vessel (15). From the vessel (15), the air is led, through line (8) within shaft (4a) to the probe (5). In the process, bursts of compressed air can be controlled by a valve (16), preferably a rapid-action valve. The pressure of the compressed air to be suddenly injected into the soil may be preset, as well as adjusted during continuous operation and while the probe is advancing so that, in any event, the soil will be loosened as required. Subsequent areas (12) eruptively loosened may be chosen to be contiguous or slightly overlapping so that a continuously loosened strip of soil is achieved. Moreover, the degree of eruptive loosening may be influenced by modifying the frequency of suddenly triggered eruptive bursts depending upon conveying speed and upon the depth of probe (5) within the soil (10).

Moreover, a reservoir (17) may be connected to the pressure generation unit (13) for holding some filler or fertilizer material. Filler and/or fertilizer material will be brought up to the feed line (8) of probe (5) through feed component (18). Within component (18), a control valve (25) may be arranged. It will be advantageous to convey filler and/or fertilizer material by way of an injector (20) to feed line (8).

Filler and/or fertilizer materials may be inserted at intervals substantially identical to those between eruptive bursts into the soil (10).

Eruptively loosening the soil and keeping it loosened by injecting, at high pressure and immediately upon loosening it, a mixture of compressed air and propping agents such as polystyrene beads, fertilizer, etc., is performed as follows:

Compressed air is brought up, via a feed line having a very large cross section, from pressure vessel (15) the volume of which determines the power potential available for the process, to rapid-action valve (16). The cross section of any such rapid-action valve has to be dimensioned so as to be sufficient, but in any event as large as possible. Whenever the rapid-action valve is closed, the compressed air delivered to the compressed air vessel by compressor (14) is accumulated. Opening valve (16) will suddenly release the energy potential so accumulated within the compressed air. Any substrate such as polystyrene beads, fertilizer materials, or other soil-curing species, are held within reservoir (17). Opening valve (16) first releases only air into feed line (8) and tubular probe (5). It goes without saying that, immediately prior to actuating the rapid-action valve, tubular probe (5) will have to be rotated within outer tube (5a) in order to free the outlet openings (7) of tubular probe (5). Rotation of the tubular probe around its longitudinal axis is synchronized with the frequency of eruptive air blasts. Thus, rotating the tubular probe according to the invention is useful as regards process safety since rotation prevents soil from clogging the tube while it is being pressed into, or advancing within, the soil. As mentioned above, the substrate or the so-called filler material will be carried along by the suddenly released air and deposited within any fissures, cracks or pores just forming within the soil being loosened. The entire process takes no more than between half a second and a second. Any substrate is introduced immediately upon any sudden release of compressed air and just as the soil is broken apart, i.e. at the moment in time when the maximum of energy is released by way of maximum air speeds and enlargement of fissures and cracks within the soil.

This coordination of soil loosening and substrate admixing is an essential condition of running the process in a trouble-free manner and of avoiding any obstruction by the substrates. To do so, it will be necessary, moreover, to proportion the cross sections of the lines supplying the rapid-action valve of an injector nozzle, the cross sections of the tubular probe and the cross-sections of its outlet openings. The respective diameters must be choosen in a ratio appropriate in view of the energy potential available (pressure multiplied by volume of pressure vessel).

In operation, the tractor advances the mounted device according to the invention in what is termed its creeping or extra-slow speed. Depending upon depth of operation as well as upon type and structure of the soil, probe operating width will range between 80 cm and 200 cm. If several probes are arranged side by side and parallel to each other, it will be preferable to have the operating areas overlap so that, for instance, three probes will result in a processed strip having a width of between 150 cm and 450 cm or 500 cm. Loosening width will increase with operating depth. Likewise, loosening will be more effective as the degree of existing compaction increases.

The compressed air process according to the invention or, respectively, the device according to the invention make it possible to loosen the soil at greater depth than with conventional mechanical processes such as ploughing, energy requirements being substantially lower than, for instance, with share-type ploughs. Another advantage consists in the fact that the process according to the invention permits fissures and cracks within the soil to be propped apart on a long-term basis, permitting a sufficiently close-meshed network of supply veins to be achieved, particularly by repeating the treatment, so that very shallow seedbed preparation will later on be frequently sufficient.

I claim:

1. A process for loosening packed soil for agricultural use comprising the steps of
   (a) supporting and positioning a probe member underneath and substantially parallel to and at a predetermined depth below the surface of the soil,
   (b) moving said probe in a direction generally parallel to a longitudinal axis of the probe, said probe having a configuration and location relative to its support so that the soil is not loosened but remains tightly packed along substantially the entire surface of the probe during such movement,
   (c) periodically releasing bursts of compressed air laterally from the probe in a direction substantially parallel to the surface of the soil, each burst being at sufficient pressure at such predetermined depth to pneumatically lift and erupt the soil, including the soil surface, and form air passages in the form of fissures and cracks extending laterally and upwardly to the surface of the soil,
   (d) controlling the frequency of said bursts, and
   (e) injecting a solid filling agent into said cracks and fissures immediately following each said burst, said agent lodging in said fissures and cracks and maintaining the soil loose and permeable.

2. A process according to claim 1, wherein the probe is continuously moved.

3. A process accordin to claim 1, wherein the step of controlling the frequency of the bursts is dependent upon the speed at which the probe is moved.

4. A process according to claim 1, wherein the step of controlling the frequency of the bursts is dependent upon the depth of the soil at which the probe is positioned.

5. A process according to claim 1, wherein the step of controlling the frequency of the bursts is dependent upon the level of pressure at which the compressed air is released.

6. A process according to claim 1, wherein the period between bursts is selected so that as the probe is moved through the soil, contiguous and overlapping loosened areas are produced.

7. A process according to claim 1, wherein the probe is positioned between about 20 cm. and about 100 cm. beneath the surface of the ground.

8. A process according to claim 1, wherein the probe is positioned between about 50 cm. and about 80 cm. beneath the surface of the ground.

9. A process according to claim 1, wherein the probe is formed with a tip at its leading end, and further comprising the step of initially introducing said tip of the probe obliquely into the soil by releasing bursts and lowering the probe into the soil loosened thereby until the probe is brought to its operational depth in a position parallel to the surface.

10. A process according to claim 1, wherein the solid filling agent comprises a dry granularfertilizer.

11. A process according to claim 1, wherein the solid filling agent comprises an inert filler.

12. A processing according to claim 1, wherein the solid filling agent comprises a mixture of inert filler and a dry granular fertilizer.

13. Apparatus for loosening packed soil for agricultural use by releasing regulated eruptive bursts of compressed air beneath the soil comprising:
(a) a generally tubular probe having a tip at its leading end and laterally extending openings near its leading end but behind said tip,
(b) means including a movable support frame for supporting said tubular probe at the end thereof opposite said tip, said probe being positioned and supported underneath and substantially parallel to and at a predetermined depth below the surface of the soil, movement of said frame resulting in movement of said probe, tip first, at such predetermined depth and in a manner such that the soil around said probe is not loosened but remains tightly packed along substantially the entire surface of the probe,
(c) means for selectively covering the lateral openings formed in said probe while said probe is advancing,
(d) means for generating and releasing regulated bursts of compressed air, and passage means for conveying said compressed air bursts to said probe,
(e) a reservoir containing a solid filling agent, and a feed line communicating said reservoir with said passage means, and
(f) means for controlling the frequency of said bursts of compressed air, whereby when each said burst is released from the lateral openings of said probe, the soil is pneumatically lifted to and through the surface of the soil to form fissures and cracks extending laterally and upwardly to the soil surface, the compressed air drawing said filling agent from said feed line into said passage means so that immediately following each burst, said filling agent is injected into said fissures and cracks so as to maintain the soil loose and permeable.

14. The apparatus of claim 13, wherein said support frame is attached to a vehicle, and further including means for adjusting the height and attitude of said frame relative to the soil surface.

15. The apparatus according to claim 13, wherein said compressed air burst generating means comprises:
a compressor;
a compressed air vessel which receives the compressed air generated by the compressor and which allows the maintenance of a reservoir of compressed air, and
a valve for releasing bursts of compressed air from the compressed air vessel through said passage means to said probe, said valve being capable of generating rapid pulses of air.

16. The apparatus according to claim 13, wherein said means for selectively covering said lateral openings formed in said probe comprise an outer tube coaxially surrounding the tubular probe and having outlets corresponding to the lateral openings of the probe, and further including means for rotating said outer tube so that the outlets of the outer tube are aligned with the lateral openings of the tubular probe during the release of compressed air, and are not aligned at other times so as to keep soil from clogging the lateral openings of the probe when the probe is advancing.

* * * * *